US007668105B1

(12) United States Patent
Zimmerman

(10) Patent No.: US 7,668,105 B1
(45) Date of Patent: Feb. 23, 2010

(54) SYSTEM FOR TESTING AND/OR EVALUATING THE PERFORMANCE OF A NETWORK SWITCHING APPARATUS

(75) Inventor: Yaron Zimmerman, Holon (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 431 days.

(21) Appl. No.: 11/491,314

(22) Filed: Jul. 21, 2006

Related U.S. Application Data

(60) Provisional application No. 60/782,240, filed on Mar. 14, 2006, provisional application No. 60/764,441, filed on Feb. 2, 2006.

(51) Int. Cl.
*G01R 31/08* (2006.01)
*G01R 27/28* (2006.01)

(52) U.S. Cl. ............... 370/241; 370/242; 370/252; 702/117

(58) Field of Classification Search ............... None
See application file for complete search history.

(56) References Cited

U.S. PATENT DOCUMENTS

| | | | |
|---|---|---|---|
| 7,222,255 B1 * | 5/2007 | Claessens et al. | 714/4 |
| 7,308,705 B2 * | 12/2007 | Gordy et al. | 726/3 |
| 2003/0179777 A1 * | 9/2003 | Denton et al. | 370/503 |
| 2003/0202510 A1 * | 10/2003 | Witkowski et al. | 370/386 |
| 2004/0015616 A1 | 1/2004 | Chen | |
| 2004/0085974 A1 * | 5/2004 | Mies et al. | 370/406 |
| 2004/0127212 A1 * | 7/2004 | Wang | 455/423 |
| 2006/0002307 A1 | 1/2006 | Wang et al. | |
| 2006/0140129 A1 * | 6/2006 | Wang | 370/241 |

FOREIGN PATENT DOCUMENTS

WO    WO 99/18695    4/1999

* cited by examiner

*Primary Examiner*—Huy D Vu
*Assistant Examiner*—Brandon Renner
(74) *Attorney, Agent, or Firm*—Brinks Hofer Gilson & Lione

(57) ABSTRACT

A system configuration for use in testing and/or evaluating a network switching apparatus is set forth. The system configuration includes a network switching apparatus that is to be tested that has a plurality of bidirectional network ports, switch fabric, and a switch fabric control. The switch fabric interconnects the plurality of bidirectional network ports while the switch fabric control directs packet flow through the switch fabric and between the plurality of bidirectional network ports in response to control parameters. A plurality of interconnections facilitate communication of packets between selected pairs of the plurality of ports. The control parameters and the plurality of interconnections are selected to direct packets through each of the plurality of bidirectional network ports for testing using a minimal number of packet generators.

41 Claims, 6 Drawing Sheets

| PORT | PVID | MAC | VLAN | TYPE |
|---|---|---|---|---|
| 0 | 2 | 00:00:00:00:00:01 | 8 | Static |
| 1 | 3 | 00:00:00:00:00:01 | 9 | Static |
| 2 | 4 | 00:00:00:00:00:01 | 2 | Static |
| 3 | 5 | 00:00:00:00:00:01 | 3 | Static |
| 4 | 6 | 00:00:00:00:00:01 | 4 | Static |
| 5 | 7 | 00:00:00:00:00:01 | 5 | Static |
| 6 | 8 | 00:00:00:00:00:01 | 6 | Static |
| 7 | 9 | 00:00:00:00:00:01 | 7 | Static |

Figure 3

| PORT | PVID | MAC | VLAN in FDB |
|---|---|---|---|
| 0 | 2 | 00:00:00:00:00:01 | 2N |
| 1 | 3 | 00:00:00:00:00:01 | 2N+1 |
| 2 | 4 | 00:00:00:00:00:01 | 2 |
| 3 | 5 | 00:00:00:00:00:01 | 3 |
| 4 | 6 | 00:00:00:00:00:01 | 4 |
| 5 | 7 | 00:00:00:00:00:01 | 5 |
| 6 | 8 | 00:00:00:00:00:01 | 6 |
| 7 | 9 | 00:00:00:00:00:01 | 7 |
| 2N-2 | 2N | 00:00:00:00:00:01 | 2N-2 |
| 2N-1 | 2N+1 | 00:00:00:00:00:01 | 2N-1 |

Figure 4

SYSTEM FOR TESTING AND/OR EVALUATING THE PERFORMANCE OF A NETWORK SWITCHING APPARATUS

CROSS-REFERENCE TO RELATED APPLICATIONS

This application claims the benefit of priority from U.S. Provisional Patent Application No. 60/782,240, filed Mar. 14, 2006, and U.S. Provisional Patent Application No. 60/764,441, filed Feb. 2, 2006, both of which are incorporated by reference.

BACKGROUND

A basic computer network includes a combination of hardware, software, and cabling, which together allow multiple computing devices to communicate with each other. The cabling interconnects a network computer with a hub, switch, or router. The hub, switch, or router facilitates transmission and reception of data, often in the form of packets, over the cabling. Switches and routers tend to be used in larger network systems rather than hubs since switches and routers include packet processing and forwarding functionality. This additional functionality increases the data carrying capacity of these larger networks. However, the additional functionality and use of these devices in larger network settings also imposes substantial performance requirements on them. Accordingly, network switching apparatus manufacturers may test the performance of these network switching apparatus during the design process and/or prior to shipment of the manufactured product.

Traditional testing and evaluation of a switch or router involves connecting each port of the network switching apparatus that is to be tested to a packet generator. Bidirectional traffic is then directed between the network switching apparatus under test and the packet generator equipment. The traffic throughput is ascertained as a measure of the performance of the system under test.

While such testing and evaluation procedures may be readily employed when the port count of the network switching apparatus under test is low, it becomes inordinately expensive to execute when the port count is high since the number of packet generators required to fully test the network switching apparatus is directly proportional to the number of ports of the network switching apparatus that concurrently are being tested. This is particularly problematic in those instances in which all of the ports of the network switching apparatus are to be tested simultaneously. Test generator ports are expensive and are often of limited number and availability within a given company. Accordingly, an alternative system configuration for performance testing and/or evaluating a network switching apparatus that uses a low number of packet generator ports is desirable.

SUMMARY

The present invention is defined by the following claims, and nothing in this section should be taken as a limitation on those claims.

By way of introduction, the preferred embodiments described below provide a system configuration for use in testing and/or evaluating a network switching apparatus. In one preferred embodiment, the system configuration includes a network switching apparatus that is to be tested that has a plurality of bidirectional network ports, switch fabric, and a switch fabric control. The plurality of bidirectional network ports include first and second packet termination ports and a remaining plurality of ports. The switch fabric interconnects the plurality of bidirectional network ports while the switch fabric control directs packet flow through the switch fabric and between the plurality of bidirectional network ports in response to control parameters. The system configuration also includes a plurality of interconnections that, for example, may be disposed exterior to the switch fabric to facilitate communication of packets between selected pairs of the remaining plurality of ports. The control parameters and the plurality of interconnections are selected to direct packets received at the first packet termination port through each of the plurality of bidirectional network ports for egress from the network switching apparatus at the second packet termination port. They are also selected to direct packets received at the second packet termination port through each of the plurality of bidirectional network ports for egress from the network switching apparatus at the first packet termination port. Packets received at the first packet termination port are directed through a given bidirectional port in a respective first direction and packets received at the second packet termination port are directed through the given bidirectional port in a respective second, opposite direction.

In another preferred embodiment, the first and second packet termination ports are logically consecutive bidirectional network ports of the network switching apparatus and the plurality of interconnections are arranged to interconnect logically consecutive bidirectional network ports. Additionally, the network switching apparatus may be VLAN aware, in which case the control parameters may include port VLAN identifiers respectively assigned to each of the plurality of bidirectional network ports. In a still further preferred embodiment, the network switching device has 2N bidirectional network ports, where the virtual local access network identifiers for the first and second packet termination ports are 2N and 2N+1, respectively, and where each of the remaining plurality of ports is assigned a virtual local access network identifier corresponding to a logical port identifier associated with the respective port. The first port may be designated as port 0 and the last port may be designated as port 2N−1.

Other preferred embodiments are provided, and each of the preferred embodiments described herein can be used alone or in combination with one another. The preferred embodiments will now be described with reference to the attached drawings.

BRIEF DESCRIPTION OF THE DRAWINGS

FIGS. 3 and 4 are tables illustrating various manners of assigning control parameters for use in the system of FIGS. 1 and 2, where the network switching apparatus under test is VLAN aware.

DETAILED DESCRIPTION OF THE PRESENTLY PREFERRED EMBODIMENTS

Figure 1:
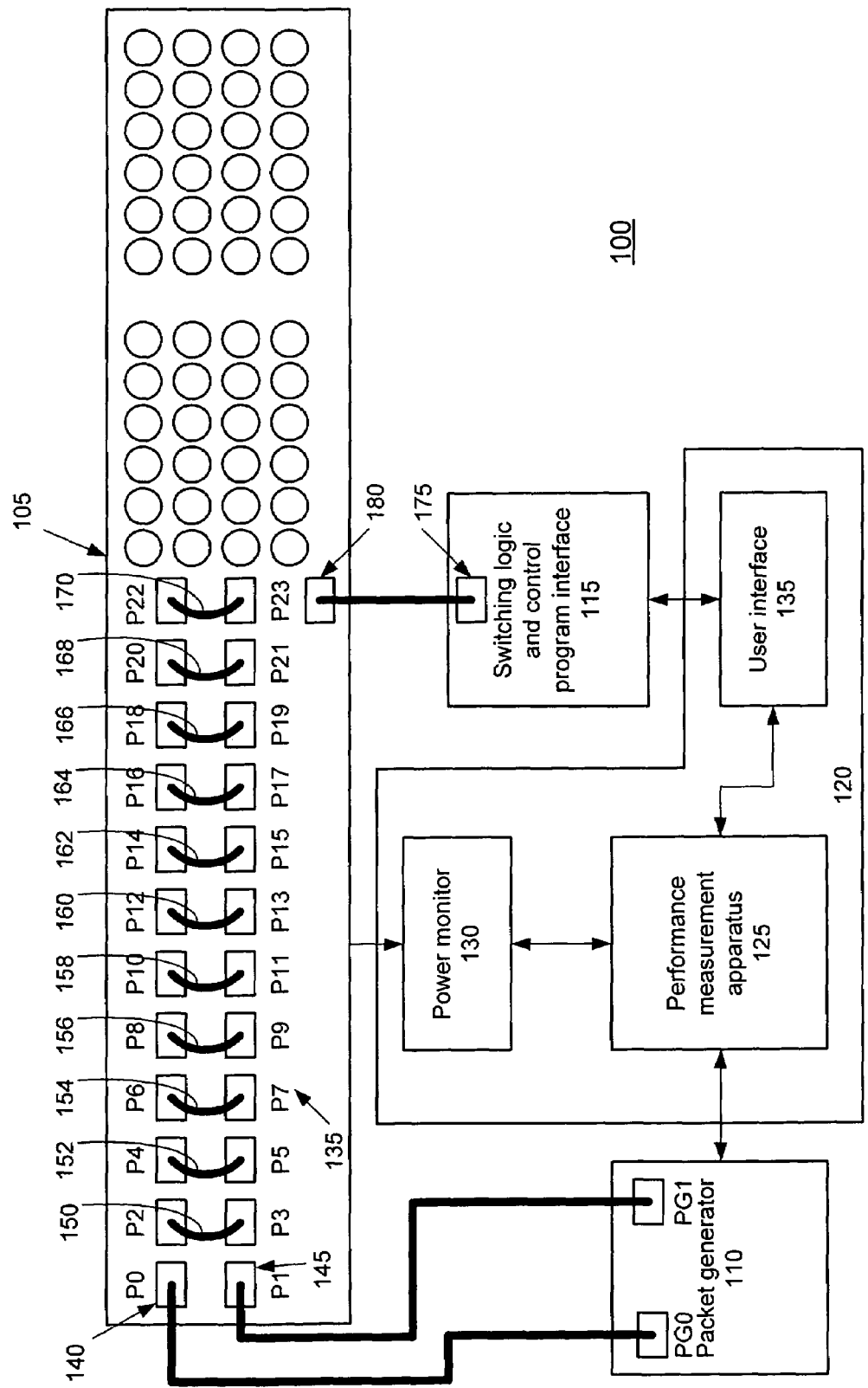
FIG. 1 is a block diagram of one manner of implementing a system for performance testing and/or evaluation of a network switching apparatus where the total number of ports is 2N=24.

FIG. 1 is a block diagram of one manner of implementing a system for evaluating the performance of a network switching apparatus. As shown, the system 100 includes a network switching apparatus 105 under test, a packet generator 110, and a switching logic and control program interface 115. The system 100 may also include a performance testing/evaluation system 120 that, in turn, includes a performance measurement apparatus 125, a power monitor 130, and a user interface 135. In this example, the user interface 135 may be shared between the performance testing/evaluation system 120 and the switching logic and control program interface 115.

The network switching apparatus 105 includes a plurality of bidirectional network ports 135 numbering 2N (where 2N=24) that are interconnected to a switch fabric (not shown in FIG. 1) through which packets are directed in response to control parameters that are provided to a switch fabric control (not shown in FIG. 1). In the illustrated implementation, there are 24 bidirectional ports that are logically numbered from P0 through P23. At least two of the ports are designated as packet termination ports 140 and 145. The packet termination ports 140 and 145 facilitate bidirectional communication with a corresponding pair of ports PG0 and PG1 of the packet generator 110. The packet termination ports 140 and 145 may be logically consecutive ports, such as the first two ports P0 and P1 of the network switching apparatus 105. However, other logically consecutive or non-consecutive ports also may be designated as the packet termination ports.

The remaining plurality of bidirectional ports P2 through P23 are interconnected with one another using, for example, cables 150 through 170. Cables 150 through 170 are disposed between selected pairs of ports to facilitate communication between the interconnected ports. In the illustrated arrangement, cables 150 through 170 are arranged to facilitate communication between logically consecutive ports of the network switching apparatus 105. To this end, cable 150 is used to facilitate communication between ports P2 and P3, cable 152 is used to facilitate communication between ports P4 and P5, etc. Although the cables 150 through 170 of the illustrated example are employed to connect logically consecutive ports, other arrangements in which logically consecutive and/or non-consecutive ports are interconnected may also be employed.

Cables 150 through 170 interconnect the selected pairs of ports with one another to allow the selected pairs to communicate with one another exterior to the main switch fabric that is employed in the network switching apparatus 105. In one example, an exterior fixture may be utilized to engage at least ports P2 through P23 and may provide the wiring for forwarding of the packet communications in the desired manner. In a further example, individual cables may be manually or automatically coupled to the ports in the illustrated manner.

The control parameters and the plurality of interconnections external to the switch fabric are selected so that packets flow through all of the ports P0 through P23 or, alternatively, a subset of ports that are to be tested. In the exemplary system, the control parameters and plurality of interconnections are selected to direct packets received at the first packet termination port 140 through each of the plurality of bidirectional network ports for egress from the network switching apparatus at the second termination port 145. The parameters and connections are also selected to direct packets received at the second packet termination port 145 through each of the plurality of bidirectional network ports for egress from the network switching apparatus at the first packet termination port 140. Packets received at the first packet termination port 140 are directed through a given port of the network switching apparatus in a first direction (i.e., the packets are either transmitted or received), while packets received at the second packet termination port 145 proceed through the given port in a second, opposite direction. For example, if packets from packet termination port 140 are routed through the system 100 so that they are output from port P3, packets from packet termination port 145 will be routed through the system 100 so that they are provided as input packets to port P3. This insures that both the input and output functionality of each port is exercised by passing packets through both the input and output of each port.

Figure 2:
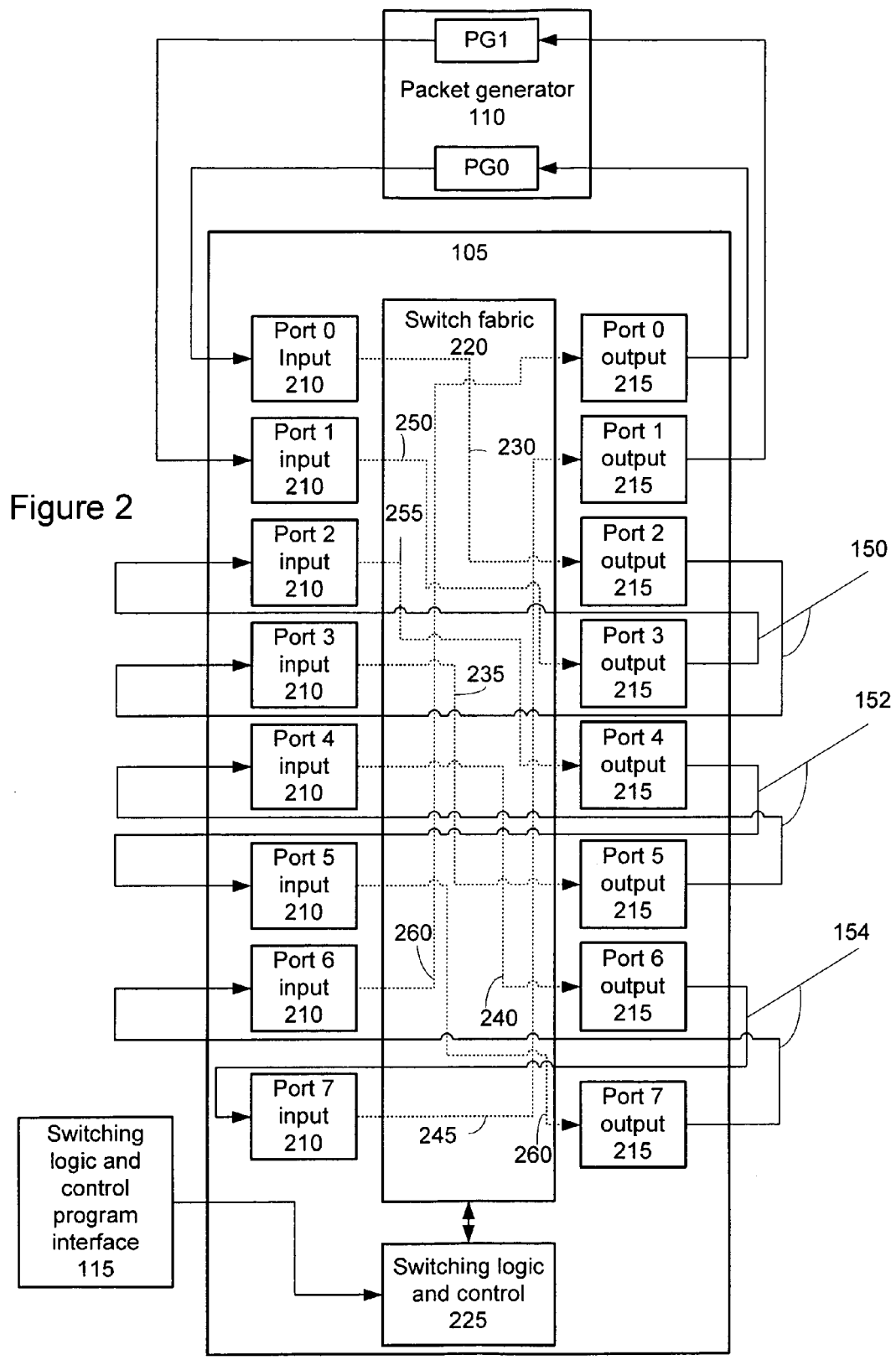
FIG. 2 is a more detailed block diagram of selected system components shown in the configuration of FIG. 1.

FIG. 2 is a block diagram of a portion of system 100 shown in FIG. 1. For the sake of simplicity, only eight bidirectional ports P0 through P7 of system 100 are shown. However, it will be recognized that the testing and/or evaluating of the bidirectional ports P0 through P7 can be readily extended to the full 24 port complement shown in FIG. 1 using the methodologies set forth below.

In the exemplary system, each bidirectional port P0 through P7 includes an input section 210 and an output section 215. The input sections 210 of each port include electronic components that are configured to receive packets from an external communication medium, such as cables 150 through 170, in the desired network format, such as a format conforming to the ethernet standard. The output sections 215 of each port include electronic components that are configured to transmit packets on an external communication medium, such as cables 150 through 170, in the desired network format, such as a format conforming to the ethernet standard.

The port input sections 210 and port output sections 215 are interconnected with one another by a switch fabric 220. In a typical network switching apparatus, the switch fabric 220 allows a connection to be established between an individual port input section 210 and each port output section 215 so that packets may be routed from any port input to any port output. Processing and forwarding of packets through the switch fabric 220 is placed under the control of parameters in the switching logic and control circuitry 225. These parameters determine how each packet received at a particular port input section 210 is handled and to which of the port output sections 215 the packet will be directed, if at all.

The parameters used by the switching logic and control 225 may be hardwired into the network switching apparatus 105 or provided through an external interface. In the system shown in FIG. 2, the switching logic and control circuitry 225 may be programmed through a switching logic and control program interface 115. As shown in FIG. 1, the control program interface 115 may include a bidirectional network port 175 that is connected for communication with a corresponding bidirectional network port 180. Switching and control parameters may be entered by a user through user interface 135 for provision to the switching logic and control 225. Although the switching logic and control program interface 115 of this embodiment is exterior to the network storage apparatus 105, the system components and programming used to implement the interface 115 may be disposed interior to the network storage apparatus 105. In such instances, interface 115 and interface 135 may both constitute intelligent components that communicate with one another using an established network protocol, such as TCP/IP.

The types of parameters used by the switching logic and control circuitry 225 for forwarding through the switch fabric 220 depend on the standards for which the network switching apparatus 105 is designed. One widely used standard is the IEEE 802.1Q standard. For illustrative purposes, it is assumed that network switching apparatus 105 complies with this standard and is VLAN aware.

In the system shown in FIG. 2, ports P0 and P1 are designated as the packet termination ports and are connected to ports PG0 and PG1 of the packet generator 110, respectively. Further, ports P2 and P3 are interconnected with one another by transmission medium 150, ports P4 and P5 with one another by transmission medium 152, and ports P6 and P7 with one another by transmission medium 154. Given this configuration, FIG. 3 is a table of parameters that may be used to program the switching logic and control circuitry 225 when the network switching apparatus 105 is VLAN aware. The parameters set forth in the table are used in conjunction with the corresponding port interconnections and packet termination port configurations to ensure bidirectional packet flow through each of the ports P0 through P7 using, for example, two bidirectional communication ports of a single packet generator 110.

Pursuant to configuring the network switching apparatus 105, the MAC layer (the protocol that controls access to the physical transmission medium on the LAN) is set for SVL (independent VLAN learning) so that a single MAC address (00:00:00: 00:00:01 used for both the source and destination address) may be learned multiple times, each in a different VLAN. All ports P0 through P7 are set so that they are tagged ports and have a static MAC address. The port VLAN identifier (PVID) for each logical port P0 through P7 is set to X+2, where X is the logical port number (i.e., P0 has a logical port number of 0 and, thus, a PVID=2). The virtual local access network identifiers (VID) for the packet termination ports 140 and 145 are members of VID=8 and VID=9, respectively. Still further, the VID members for the remaining ports P2 through P7 are set to the same value as the logical number of the port (i.e., port P2 is a member of VID=2, port P3 is a member of VID=3, etc.)

The manner in which packets flow through the network switching apparatus 105 during testing/evaluation is shown in FIG. 2, where solid lines represent transmission medium external to the switch fabric 220 and dotted lines represent switching of packets through the switch fabric 220 when the switching logic and control 225 is programmed using the parameters shown in the table of FIG. 3. In this particular embodiment, all the packets that flow through the network switching apparatus 105 are known unicast packets and their MAC_DA and VID assignments can be found in the MAC table. An incoming packet is assigned a VID according to the PVID of the incoming port on which it is received. The PVID overrides any previous VID assignment. The packet is then switched through the switch fabric 220 according to its MAC_DA and VID match in the MAC table. The MAC_DA and MAC_SA are consistent across the packet route, but the VID changes on every entry of the packet to another incoming port. The outgoing port is a member of the assigned VID.

With reference to FIG. 2, packets that are generated at the output of port PG0 of packet generator 110 are provided to the input section of port P0 of the network switching apparatus 105, which overrides the VIDs of the packets and assigns a new VID=2 to each packet. Since logical port P2 is a member of VLAN 2, the packets are switched through switch fabric 220 along connection 230 for transmission at the output of logical port P2. Packets transmitted at the output section of logical port P2 are transmitted along transmission medium 150 to the input of logical port P3, which overrides the VIDs of the packets and assigns a new VID=5. Since logical port P5 is a member of VLAN 5, the packets are switched through switch fabric 220 along connection 235 for transmission at the output of logical port P5. Packets transmitted at the output section of logical port P5 are transmitted along transmission medium 152 to the input of logical port P4, which overrides the VIDs of the packets and assigns a new VID=6. Since logical port P6 is a member of VLAN 6, the packets are switched through switch fabric 220 along connection 240 for transmission at the output of logical port P6. Packets transmitted at the output section of logical port P6 are transmitted along transmission medium 154 to the input of logical port P7, which overrides the VIDs of the packets and assigns a new VID=9. Since logical port P1 is a member of VLAN 9, the packets are switched through switch fabric 220 along connection 245 for transmission at the output of logical port P1. Packets transmitted at the output section of logical port P1 are received at the input section of port PG1 of packet generator 110.

In the foregoing transmission sequence, the packets flow through each of the ports in only a single direction. For example, packets received at the input section of logical port P0 only pass through the input section of the port and are not routed to the output section of the port. Similarly, the packets received at the input section of logical port P0 only passed through the output section of logical port P2 and are not routed to the input section of port P2. As such, a further stream of packets is generated at the output section of port PG1 of packet generator 110 to test packet flow through the network switching apparatus 105 in a direction opposite the flow of packets provided at the output section of port PG0 of packet generator 110 through apparatus 105.

With reference again to FIG. 2, packets that are generated at the output of port PG1 of packet generator 110 are provided to the input section of port P1 of the network switching apparatus 105, which overrides the VIDs of the packets and assigns a new VID=3 to each packet. Since logical port P3 is a member of VLAN 3, the packets are switched through switch fabric 220 along connection 250 for transmission at the output of logical port P3. Packets transmitted at the output section of logical port P3 are transmitted along transmission medium 150 to the input of logical port P2, which overrides the VIDs of the packets and assigns a new VID=4. Since logical port P4 is a member of VLAN 4, the packets are switched through switch fabric 220 along connection 255 for transmission at the output of logical port P4. Packets transmitted at the output section of logical port P4 are transmitted along transmission medium 152 to the input of logical port P5, which overrides the VIDs of the packets and assigns a new VID=7. Since logical port P7 is a member of VLAN 7, the packets are switched through switch fabric 220 along connection 260 for transmission at the output of logical port P7. Packets transmitted at the output section of logical port P7 are transmitted along transmission medium 154 to the input of logical port P6, which overrides the VIDs of the packets and assigns a new VID=8. Since logical port P0 is a member of VLAN 8, the packets are switched through switch fabric 220 along connection 265 for transmission at the output of logical port P0. Packets transmitted at the output section of logical port P0 are received at the input section of port PG0 of packet generator 110. This flow of packets through the network switching apparatus 105 between the output section of port PG0 and the input section of port PG1 is complementary to the flow of packets between the output section of port PG1 and the input section of port PG0 so that both the input section and output section of each port P0 through P7 are tested.

FIG. 4 is a generic table of parameters that may be used in connection with a network switching device having 2N ports that are to be tested. As shown, packet termination ports P0 and P1 are assigned VIDs of 2N and 2N+1, respectively. Since only two termination ports are employed, the PVID for each logical port P0 through P7 is set to X+2, where X is the logical port number (i.e., P0 has a logical port number of 0 and, thus, a PVID=2). The VIDs for the remaining ports P2 through P(2N−1) (assuming port numbers start at logical port P0) are set to the same value as the logical number of the port (i.e., port P2 is assigned to VID=2, port P3 is assigned to VID=3, etc.) Extension of the testing/evaluation to the total number of ports may be achieved, for example, by adding further external cabling between the ports and programming the switching logic and control in the manner shown and FIG. 4.

To avoid the necessity of using cabled connections between each pair of ports, the PHYs of the network switching apparatus may be set to near-end loopback. As such, the outgoing traffic will be sent back to the apparatus. Further, many network switching apparatus include an ability to send a packet back to the source port that generated the packets. With this ability enabled, the traffic transmitted into the network switching apparatus will be transmitted back to the packet generator on the same port. This latter configuration is only suitable when the number of ports that are tested/evaluated on the network switching apparatus is odd.

Figure 5:
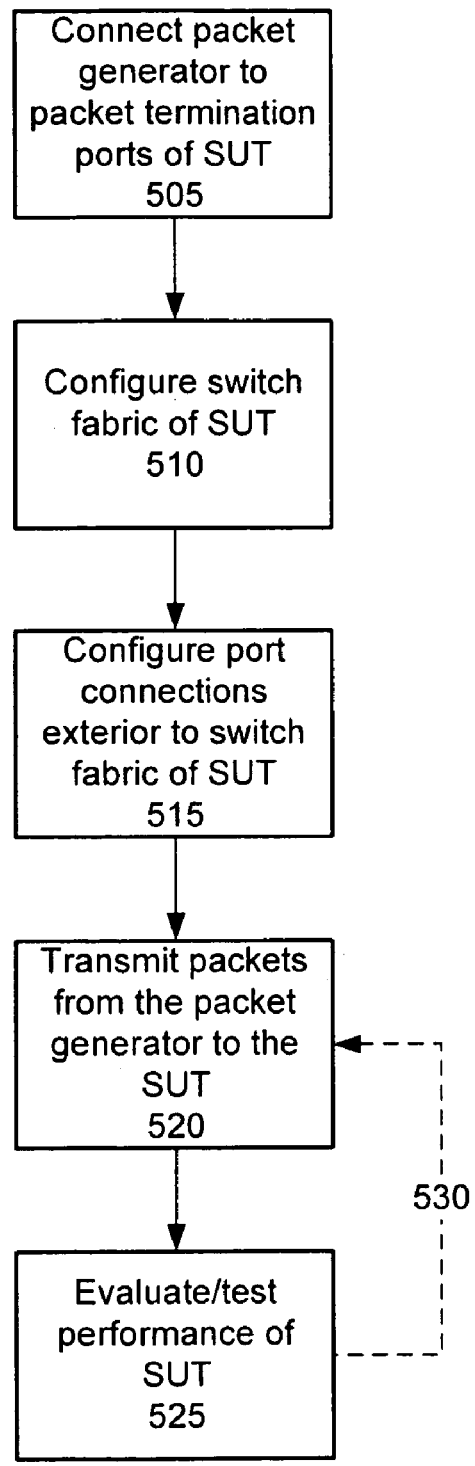
FIG. 5 is a flow chart illustrating one manner of testing/evaluating the performance of the network switching apparatus shown in FIGS. 1 and 2.

The disclosed system configuration is suitable for performance tests, power consumption measurement, qualification testing, and the like. FIG. 5 is a flow chart illustrating a plurality of interrelated operations that may be used to execute such testing and/or evaluations using this configuration. As shown, a packet generator is connected to the packet termination ports of the system under test (SUT) at block 505. Here, the SUT corresponds to the network switching apparatus 105. The switch fabric of the SUT is configured at block 510 through, for example, programming of the switch control parameters of the SUT. At block 515, the port connections exterior to the switch fabric are configured in a manner that cooperates with the flow of packets through the switch fabric as determined, for example, by the switch control parameters to achieve a complementary flow of packets through each of the ports under test. The packet generator sends packets to the termination ports of the SUT at block 520, and the SUT is subject to evaluation at block 525. Iterative evaluations and/or different evaluations may be performed as indicated by dotted line 530 pursuant to comprehensive testing and/or evaluation of the SUT.

Figure 6:
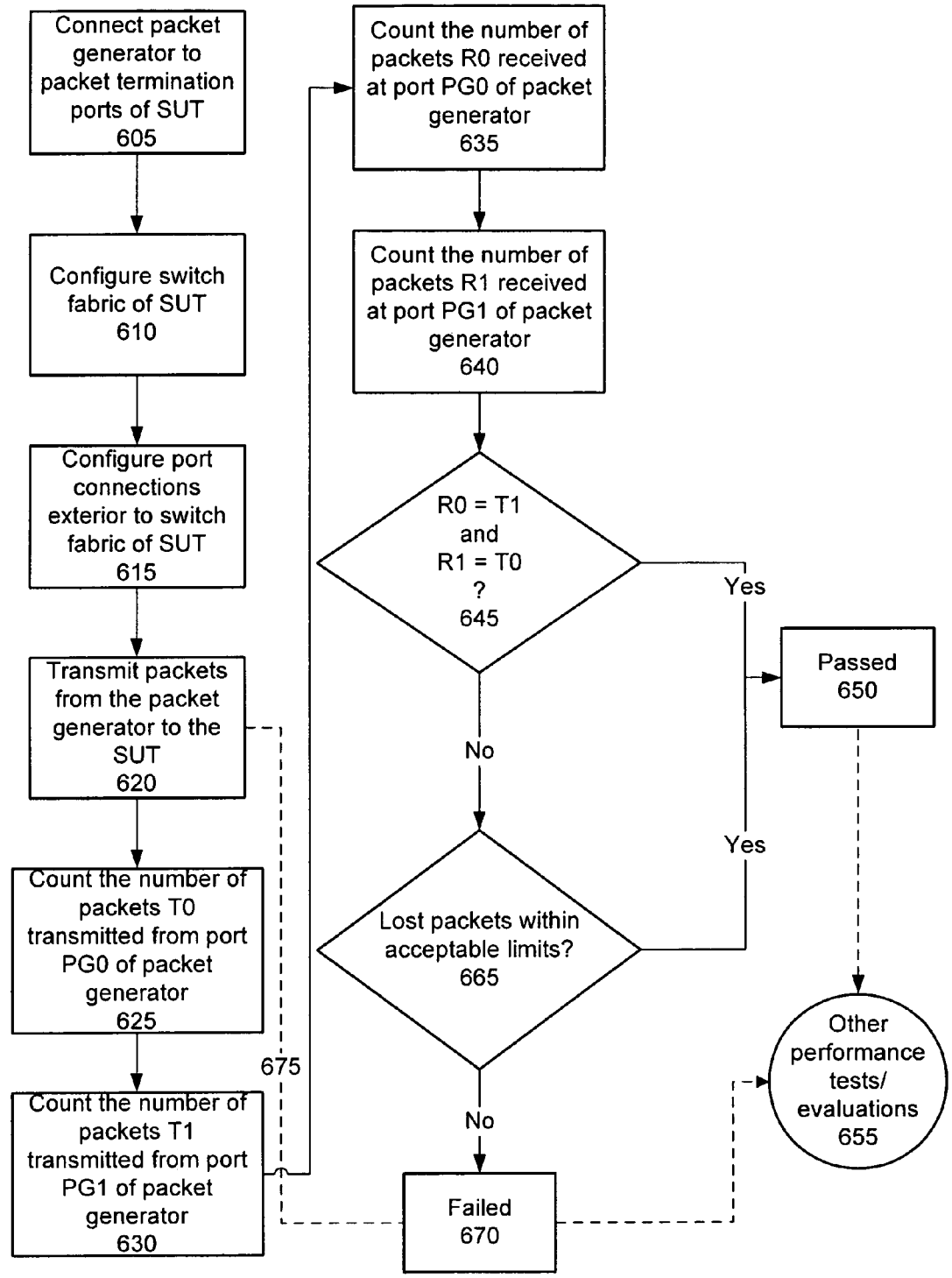
FIG. 6 is a flow chart illustrating a further manner of testing/evaluating the performance of the network switching apparatus shown in FIGS. 1 and 2.

FIG. 6 is a flow chart illustrating a plurality of interrelated operations that may be used to execute pair forwarding or non-meshed forwarding evaluation of the SUT. As shown, a packet generator is connected to the packet termination ports of the SUT at block 605. The switch fabric of the SUT is configured at block 610 through, for example, programming of the switch control parameters of the SUT. At block 615, the port connections exterior to the switch fabric are configured in a manner that cooperates with the flow of packets through the switch fabric as determined, for example, by the switch control parameters to achieve a complementary flow of packets through each of the ports under test.

The packet generator sends packets to the termination ports of the SUT at block 620 and the SUT is then subject to evaluation. Pursuant to this evaluation, the number of packets T0 transmitted from port PG0 of the packet generator are counted at block 625 and the number of packets T1 transmitted from port PG1 of the packet generator are counted at block 630. Similarly, the number of packets R0 received at port PG0 of the packet generator are counted at block 635 and the number of packets R1 received at port PG1 of the packet generator are counted at block 640. At block 645, the number of received packets R0 is compared to the number of transmitted packets T1 and the number of received packets R1 is compared to the number of transmitted packets T0. If R0=T1 and R1=T0, the SUT may be deemed to have passed the evaluation at block 650. Upon passing the evaluation at block 650, the evaluation may be terminated, other evaluations may be executed as at 655.

If R0≠T1 and/or R1≠T0, an inquiry may be made at block 665 to determine whether the differences T1−R0 and/or T0−R1, indicative of the number of lost packets, fall within acceptable limits. When the differences fall within acceptable limits, the SUT may be deemed to have passed the evaluation at block 650. However, if the differences fall outside the scope of the predetermined acceptable limits, the SUT may be deemed to have failed the evaluation at block 670. Upon failing the evaluation at block 670, further evaluation may be terminated, other evaluations may be executed as at 655, or the pair forwarding/non-meshed forwarding evaluation may be repeated as shown by line 675.

A single packet loss represents more than one packet loss in the network switching apparatus, since the packet loss causes a loss of packets on any port that is subsequent to the port at which the first loss occurred. For example, assume that a test on an SUT with 24 ports is conducted and results in two lost packets. By reading the MIB counters of the apparatus, it is determined that the loss occurred in the fifth port of the chain. This means that two packets are missing from ports P4 through P23. The total packet loss can then be determined as (24−5)*2=38 packets. It is this number that also may be used in the evaluation and/or testing of the SUT set forth in FIG. 6.

Figure 7:
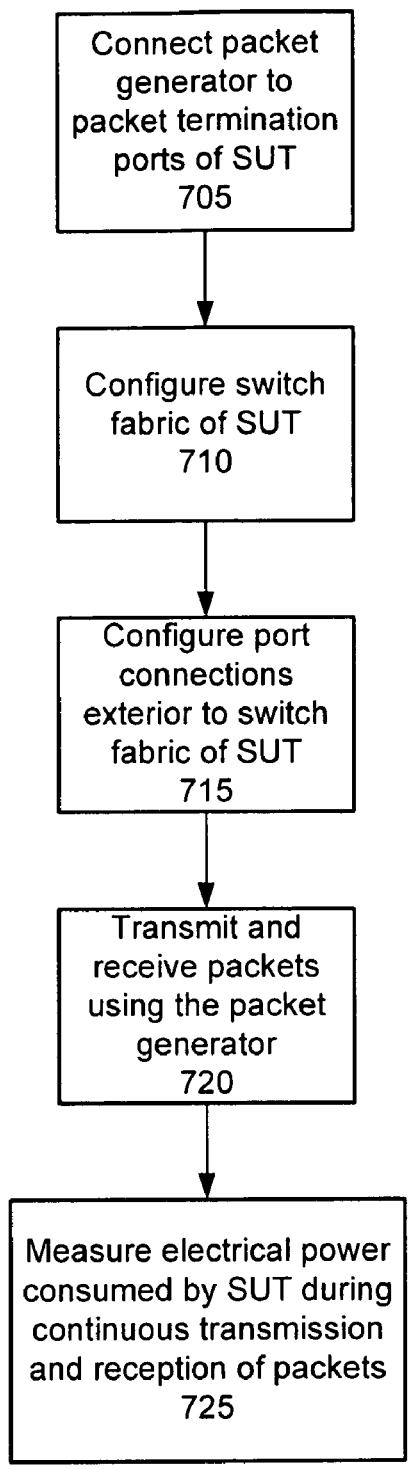
FIG. 7 is a flow chart illustrating a still further manner of performing power measurements of the network switching apparatus shown in FIGS. 1 and 2.

FIG. 7 is a flow chart illustrating a plurality of interrelated operations that may be used to execute power consumption evaluation of the SUT. As shown, a packet generator is connected to the packet termination ports of the SUT at block 705. The switch fabric of the SUT is configured at block 710 through, for example, programming of the switch control parameters of the SUT. At block 715, the port connections exterior to the switch fabric are configured in a manner that cooperates with the flow of packets through the switch fabric as determined, for example, by the switch control parameters to achieve a complementary flow of packets through each of the ports under test. The packet generator sends packets to the termination ports of the SUT at block 720 and the SUT is then subject to evaluation. Pursuant to this evaluation, the electrical power consumed by the SUT during continuous transmission and reception of packets is measured at block 725.

The performance tests and evaluations described in connection with FIGS. 5 through 7 may be executed manually or may be automated. With reference to FIG. 1, the performance testing/evaluation system 120 may be used to automate such tests and evaluations. To this end, the performance measurement apparatus 125 may be connected to control operation of the packet generator 110 and to receive the values for R0, R1, T0, and T1. Power measurements may be obtained by the performance measurement apparatus 125 from the power monitor 130, which is connected to monitor the voltage and/or current flow to the network switching apparatus 105. The performance measurement apparatus 125 may display the results of the testing and evaluations on the user interface 135. The results may be displayed in a wide variety of manners. For example, the measured values, acceptable value limits, and/or pass/fail indicators may be provided. This visual information may include information indicative of packet throughput and frame loss of the network switching apparatus It is intended that the foregoing detailed description be understood as an illustration of selected forms that the invention can take and not as a definition of the invention. It is only the following claims, including all equivalents, that are intended to define the scope of this invention.

What is claimed is:

1. A system configuration for use in testing and/or evaluating a network switch comprising:
   a network switch, the network switch having disposed internally therein:
   a plurality of bidirectional network ports,
   switch fabric interconnecting the plurality of bidirectional network ports that are disposed in the network switch, and
   switch fabric control directing packet flow through the switch fabric and between the plurality of bidirectional network ports that are disposed internally in the network switch in response to control parameters, where the control parameters are selected to configure the switch fabric to delimit the plurality of bidirectional network ports into a first packet termination port, a second packet termination port and a remaining plurality of ports;
   a plurality of interconnections disposed exterior to the network switch to communicate packets directly between respective pairs of the remaining plurality of ports;
   where the control parameters are further selected to configure the switch fabric to direct packets received at the first packet termination port unidirectionally through the switch fabric between respective pairs of the remaining plurality of ports for egress at the second packet termination port, and to configure the switch fabric to direct packets received at the second packet termination port unidirectionally through the switch fabric between respective pairs of the remaining plurality of ports for egress at the first packet termination port, where packets received at the first packet termination port are directed through a given bidirectional port in a respective first direction and packets received at the second packet termination port are directed through the given bidirectional port in a respective second, opposite direction.

2. The system configuration of claim 1, further comprising a packet generator having a first bidirectional port in communication with the first packet termination port of the network switch and a second bidirectional port in communication with the second packet termination port of the network switch.

3. The system configuration of claim 1, where the first and second packet termination ports are logically consecutive bidirectional network ports.

4. The system configuration of claim 3, where the plurality of interconnections are arranged to interconnect respective logically consecutive bidirectional network ports of the plurality of bidirectional network ports.

5. The system configuration of claim 1, where the network switch is VLAN aware.

6. The system configuration of claim 4, where the network switch is VLAN aware.

7. The system configuration of claim 4, where the control parameters comprise a port VLAN identifier respectively assigned to each of the plurality of bidirectional network ports.

8. The system configuration of claim 6, where the control parameters comprise a virtual local access network identifier respectively assigned to each of the plurality of bidirectional network ports.

9. The system configuration of claim 8, where each of the plurality of bidirectional network ports is associated with a corresponding MAC table entry of the network switch, and where the MAC table entries are static.

10. The system configuration of claim 8, where the network switch comprises 2N bidirectional network ports, where the virtual local access network identifiers for the first and second packet termination ports are 2N and 2N+1, respectively, and where each of the remaining plurality of ports is assigned a virtual local access network identifier corresponding to a logical port identifier associated with the respective port.

11. The system configuration of claim 1, and further comprising a performance testing/evaluation system disposed to evaluate packet throughput and/or frame loss of the network switch.

12. The system configuration of claim 11, where the performance testing/evaluation system comprises a user interface to provide visual information indicative of network switch operation.

13. The system configuration of claim 12, where the user interface provides visual information indicative of packet throughput and frame loss of the network switch.

14. The system configuration of claim 1, and further comprising a performance testing/evaluation system disposed to measure power consumption of the network switch during packet communication through the network switching apparatus.

15. A system configuration for use in testing and/or evaluating a network switching means comprising:
   network switching means for controlling communication of packets through a network, the network switching means comprising
     a plurality of bidirectional network port means for conducting bidirectional packet communication therethrough, where the plurality of bidirectional network port means is internal to the network switching means,
     switch fabric means for interconnecting the plurality of bidirectional network port means, where the switch fabric means is internal to the network switching means, and
     switch fabric control means for directing packet flow through the switch fabric and between the plurality of bidirectional network port means in response to control parameters, where the switch fabric control means is internal to the network switching means, where the control parameters are selected to configure the switch fabric means to delimit the plurality of bidirectional network port means into a first packet termination port, a second packet termination port and a remaining plurality of ports;
   a plurality of interconnection means exterior to the network switching means for communicating packets directly between respective pairs of the remaining plurality of ports;
   where the control parameters are further selected to configure the switch fabric means to direct packets received at the first packet termination port unidirectionally through the switch fabric means between respective pairs of the remaining plurality of port means for egress at the second packet termination port, and to configure the switch fabric to direct packets received at the second packet termination port unidirectionally through the switch fabric means between respective pairs of the remaining plurality of port means for egress at the first packet termination port, where packets received at the first packet termination port are directed through a given bidirectional port means in a respective first direction and packets received at the second packet termination port are directed through the given bidirectional port means in a respective second, opposite direction.

16. The system configuration of claim 15, further comprising packet generation means for generating packets, the packet generation means having first bidirectional port means in communication with the first packet termination port of the network switching means and a second bidirectional port in communication with the second packet termination port of the network switching means.

17. The system configuration of claim 15, where the first and second packet termination port comprise logically consecutive bidirectional network ports of the plurality of bidirectional network port means.

18. The system configuration of claim 17, where the plurality of interconnection means are arranged to interconnect logically consecutive bidirectional network ports of the plurality of bidirectional port means.

19. The system configuration of claim 15, where the network switching means is VLAN aware.

20. The system configuration of claim 18, where the network switching means is VLAN aware.

21. The system configuration of claim 18, where the control parameters comprise a port VLAN identifier respectively assigned to each port means of the plurality of bidirectional network port means.

22. The system configuration of claim 20, where the control parameters comprise a virtual local access network identifier respectively assigned to each of the plurality of bidirectional network port means.

23. The system configuration of claim 22, where each of the plurality of bidirectional network is associated with a corresponding MAC table entry of the network switching apparatus, and where the MAC table entries are static.

24. The system configuration of claim 22, where the network switching means comprises 2N bidirectional network port means, where the virtual local access network identifiers for the first and second packet termination ports are 2N and 2N+1, respectively, and where each of the remaining plurality of ports is assigned a virtual local access network identifier corresponding to a logical port identifier associated with the respective port.

25. The system configuration of claim 15, and further comprising a performance testing/evaluation means for evaluating packet throughput and/or frame loss of the network switching means.

26. The system configuration of claim 25, where the performance testing/evaluation means comprises a user interface means for providing visual information indicative of network switching means operation.

27. The system configuration of claim 26, where the user interface means provides visual information indicative of packet throughput and frame loss of the network switching means.

28. The system configuration of claim 15, further comprising a performance testing/evaluation means for measuring power consumption of the network switching means during packet flow through the network switching means.

29. A method for testing and/or evaluating a network switch comprising:
providing a plurality of interconnections exterior to the network switch to communicate packets directly between respective pairs of a plurality of bidirectional ports of the network switch;
configuring a switch fabric internal to the network switch to delimit a first packet termination port, a second packet termination port, and a plurality of remaining ports from the plurality of bidirectional ports; further configuring the switch fabric to direct packets received at the first packet termination port of the network switch unidirectionally through the switch fabric between respective pairs of the remaining ports of the network switch for egress from the network switch at the second packet termination port of the network switch, and to direct packets received at the second packet termination port unidirectionally through the switch fabric between respective pairs of the remaining ports for egress from the network switch at the first packet termination port, where packets received at the first packet termination port are directed through a given bidirectional port in a respective first direction and packets received at the second packet termination port are directed through the given bidirectional port in a respective second, opposite direction.

30. The method of claim 29, further comprising:
utilizing a first bidirectional port of a packet generator for bidirectional packet communication with the first packet termination port of the network switch; and
utilizing a second bidirectional port of the packet generator for bidirectional packet communication with the second packet termination port of the network switch.

31. The method of claim 29, further comprising using logically consecutive bidirectional network ports as the first and second packet termination ports.

32. The method of claim 31, further comprising arranging the plurality of interconnections to interconnect logically consecutive bidirectional network ports of the network switch.

33. The method of claim 29, where the network switch is VLAN aware and the control parameter assignment comprises assigning a port VLAN identifier respectively assigned to each of the plurality of bidirectional network ports.

34. The method of claim 33, further comprising assigning a virtual local access network identifier respectively to each of the plurality of bidirectional network ports.

35. The method of claim 34, further comprising associating each of the plurality of bidirectional network ports with a corresponding MAC table entry of the network switch, where the MAC table entries are static.

36. The method of claim 34, where the network switch comprises 2N bidirectional network ports, and the method further comprises:
assigning virtual local access network identifiers of 2N and 2N+1, respectively, to the first and second packet termination ports; and
assigning a virtual local access network identifier corresponding to a logical port identifier associated with the respective port to each of the remaining plurality of ports.

37. The method of claim 29, further comprising measuring packet throughput and/or frame loss through the network switch.

38. A system comprising:
a network switch that is to be tested, the network switch having disposed internally therein a plurality of bidirectional network ports, where the network switch is configured to define a first packet termination port a second packet termination port from the plurality of bidirectional ports and a remaining plurality of ports;
a plurality of interconnections disposed exterior to the network switch to communicate packets directly between respective pairs of the remaining plurality of ports;
where the network switch is further configured to direct packets received at the first packet termination port internally between respective pairs of the remaining plurality of ports for egress at the second packet termination port, and to configure the network switch to direct packets received at the second packet termination port internally between respective pairs of the remaining plurality of ports for egress at the first packet termination port, where packets received at the first packet termination port are directed through a given bidirectional port in a respective first direction and packets received at the second packet termination port are directed through the given bidirectional port in a respective second, opposite direction.

39. The system of claim 38, further comprising a packet generator having a first bidirectional port in communication with the first packet termination port of the network switch and a second bidirectional port in communication with the second packet termination port of the network switch.

40. The system of claim 38, where the first and second packet termination ports are logically consecutive bidirectional network ports.

41. The system of claim 40, where the plurality of interconnections are arranged to interconnect respective logically consecutive bidirectional network ports of the plurality of bidirectional network ports.

* * * * *